United States Patent
Kondo et al.

(10) Patent No.: US 7,724,341 B2
(45) Date of Patent: May 25, 2010

(54) LIQUID CRYSTAL PANEL SEAL BARRIER AND METHOD OF MANUFACTURING THE SAME

(75) Inventors: Masahiko Kondo, Nara (JP); Shingo Jogan, Kyoto (JP)

(73) Assignee: Sharp Kabushiki Kaisha, Osaka (JP)

( * ) Notice: Subject to any disclaimer, the term of this patent is extended or adjusted under 35 U.S.C. 154(b) by 185 days.

(21) Appl. No.: 11/908,956

(22) PCT Filed: Mar. 20, 2006

(86) PCT No.: PCT/JP2006/305589

§ 371 (c)(1),
(2), (4) Date: Nov. 19, 2007

(87) PCT Pub. No.: WO2006/098476

PCT Pub. Date: Sep. 21, 2006

(65) Prior Publication Data

US 2008/0151172 A1      Jun. 26, 2008

(30) Foreign Application Priority Data

Mar. 18, 2005  (JP) .............................. 2005-078664

(51) Int. Cl.
*G02F 1/1339*  (2006.01)

(52) U.S. Cl. ..................................... 349/153; 349/190
(58) Field of Classification Search ................ 349/153, 349/190
See application file for complete search history.

(56) References Cited

U.S. PATENT DOCUMENTS 6,357,763 B2 *  3/2002  Mathew et al. .............. 277/628

FOREIGN PATENT DOCUMENTS

| JP | 2002-202512 A | 7/2002 |
| JP | 2002202512 A * | 7/2002 |
| JP | 2002-350873 A | 12/2002 |
| JP | 2002350873 A * | 12/2002 |
| JP | 2004-233648 A | 8/2004 |

* cited by examiner

*Primary Examiner*—Mike Qi
(74) *Attorney, Agent, or Firm*—Birch, Stewart, Kolasch & Birch, LLP

(57) ABSTRACT

A liquid crystal display panel includes a color filter substrate, a TFT substrate, a loop-shaped sealant formed along the peripheries of the substrates, a loop-shaped seal barrier formed along the sealant in the interior of the sealant, and a liquid crystal layer surrounded by the seal barrier. The seal barrier includes an inclined face in the sealant side.

9 Claims, 4 Drawing Sheets

LIQUID CRYSTAL PANEL SEAL BARRIER AND METHOD OF MANUFACTURING THE SAME

TECHNICAL FIELD

The present invention relates to liquid crystal panels and manufacturing methods thereof. Particularly, it relates to a liquid crystal panel in which a liquid crystal layer is formed by a one drop fill method.

BACKGROUND ART

The process of manufacturing a liquid crystal panel includes a step of filling a liquid crystal material into a panel. A method for filling the liquid crystal material includes a dipping method and a dispense method. These methods employ a scheme in which a pair of substrates are joined to each other with a sealant interposed; a liquid crystal material is filled through an opening of the sealant by utilizing capillarity and pressure difference; and then, the opening is sealed. In association with upsizing the screens, however, a problem arises that the tact time for filling the liquid crystal material is longer.

As another method of filling the liquid crystal material into the panel, a one drop fill method (it may be called ODF or a drop joining method) has been developed. The one drop fill method is a method in which the liquid crystal material is dropped within a seal pattern frame of which seal pattern has no opening and which is formed on one of the substrates before bonding and the sealant is cured after the pair of substrates are joined to each other under reduced pressure. The one drop fill method can cope with upsizing of the screens and can shorten the tact time for filling the liquid crystal material remarkably.

In one drop fill method, however, an uncured sealant, which is the sealant before being cured, is in contact with the liquid crystal material to invite contamination of the liquid crystal layer with the components of the sealant. This leads to unstable state of liquid crystal orientation, smear, irregularity, flicker, and the like to degrade the display quality of the liquid crystal panel.

A technique for preventing the uncured sealant from being in contact with the liquid crystal material in the one drop fill method is disclosed in Patent Documents 1 and 2. Specifically, they discloses that a seal barrier is provided on the liquid crystal layer side of the sealant to prevent the uncured sealant from being in contact with the liquid crystal material.
Patent Document 1: Japanese Patent Application Laid Open Publication No. 2002-350873
Patent Document 2: Japanese Patent Application Laid Open Publication No. 2004-233648

SUMMARY OF THE INVENTION

Problems that the Invention is to Solve

In the techniques disclosed in the patent documents, however, the plane on the sealant side of the seal barrier is perpendicular to each plane of the substrates to involve bubbles into the sealant in applying the sealant to invite creation of an air gap between the seal barrier and the sealant. Further, substrate bonding is typically performed under reduced pressure to expand the bubbles involved in the sealant to increase the volume of a part of the sealant which is squeezed out from the edges of the substrates more than an expected volume thereof. Moreover, when the bubbles involved in the sealant is expanded and burst, the sealant may fly to the display section, thereby inviting deterioration of display quality. Furthermore, when the atmosphere is returned to the air pressure for curing the sealant, outside air may be involved into the sealant through the edges of the substrates in association with contraction of the expanded bubbles. Thus, the volume of the sealant interposed between the pair of substrates is less than the planed volume thereof to invite lack of sealant and lowering of the bonding strength. Lowering of the bonding strength may cause relative displacement between the pair of substrates to lower the display quality.

Means for Solving the Problems

One of the objects of the present invention is to prevent contamination of a liquid crystal layer with the components of a sealant. Another object of the present invention is to maintain the bonding strength of the sealant. The ultimate object of the present invention is to ensure the reliability of a liquid crystal panel by maintaining the excellent display quality thereof.

In a liquid crystal panel in accordance with the present invention, the plane on the sealing side of a seal barrier formed in the interior (on the liquid crystal layer side) of a sealant is inclined relative to the plane of the substrate face. Specifically, the liquid crystal panel in accordance with the present invention includes a first substrate, a second substrate opposed to the first substrate, a loop-shaped sealant formed around peripheries of the first substrate and the second substrate between the first substrate and the second substrate, a loop-shaped seal barrier formed along the sealant in interior of the sealant, and a liquid crystal layer surrounded by the seal barrier, wherein the seal barrier includes an inclined face in a sealant side. The sealant in the present invention is in a loop shape (closed frame shape) having no opening through which a liquid crystal material is to be injected. In other words, a liquid crystal layer is formed by the one drop fill method in the liquid crystal panel in accordance with the present invention.

The liquid crystal panel in accordance with the present invention includes the seal barrier formed in the interior (in the liquid crystal layer side) of the sealant, thereby preventing contamination of the liquid crystal layer with uncured components of the sealant. With the plane in the sealant side of the seal barrier inclined relative to the plane of the first substrate, the contact area of the seal barrier with the sealant increases when compared with the case where the plane in the sealant side of the seal barrier is perpendicular to the plane of the first substrate. This increases the reliability of bonding strength between the seal barrier and the sealant to prevent relative displacement between the first substrate and the second substrate definitely. Further, the width of the sealant can be reduced, thereby enabling reduction in area of the non-display region around the liquid crystal display panel which does not contribute to display. Hence, the liquid crystal display panel can be reduced in size.

In one preferred aspect of the liquid crystal panel in accordance with the present invention, the sealant is made of a component containing a photo-curing agent, and the first substrate and the seal barrier have light permeation property. The seal barrier of the liquid crystal panel in accordance with the present invention has an inclined face in the sealant side thereof so that the contact area thereof with the first substrate is larger than the contact area thereof with the second substrate. In this aspect, the first substrate and the seal barrier have light permeation property, and therefore, in irradiating light (typically, a ultraviolet ray) for curing the sealant through the first substrate (or the second substrate), more light is allowed to be incident to the interface between the seal barrier and the sealant when compared with the case where the plane on the sealant of the seal barrier is perpendicular to the plane of the first substrate. This leads to an increase in bonding reliability of the sealant with the first substrate through the seal barrier further. In the present invention, "light" includes visible light, ultraviolet rays, and X-rays.

The sealant is not limited to only a photo-polymerized sealant cured of which photo-curing action progresses by applying light, but a photo-curing sealant, but a photo-curing and thermosetting sealant of which curing action progresses by both light application and heating may be applicable. In other words, the sealant may be made of a compound containing not only a photo-curing agent but also a thermosetting agent.

Generally, to shorten the contact time of the liquid crystal and the sealant as far as possible, the thermosetting sealant is not used in the one drop fill method because the curing time of the thermosetting sealant is longer than that of the photo-curing sealant. In contrast since the present invention can prevent contact between the sealant and the liquid crystal layer, the thermosetting sealant for curing by heating only can be used.

The liquid crystal panel in accordance with the present invention, the inclined face may have a light scattering characteristic. To do so, for example, the inclined face may be convexly curved toward the sealant or may be bumpy. With the inclined face having the light scattering characteristic, light incident for curing the sealant is scattered at the interface between the seal barrier and the sealant to harden the sealant around the interface farther definitely.

Further, the seal barrier may be formed of two or more kinds of phases different from each other in refractive index. For example, the seal barrier may include beads or bubbles. When the seal barrier is composed of two or more phases different from each other in refractive index, the incident light for curing the sealant is scattered inside the seal barrier to cure the sealant around the interface between the seal barrier and the sealant further definitely.

The present invention also provides a method for manufacturing the liquid crystal panel in accordance with the present invention in which the sealant is formed of a compound containing a photo-curing agent and the first substrate and the seal barrier have light permeation property. The liquid crystal panel manufacturing method in accordance with the present invention includes the steps of: forming the seal barrier in a loop shape on the first substrate; applying an uncured sealant in the inclined face side of the seal barrier; dropping a liquid crystal material within a region surrounded by the seal barrier; bonding the first substrate and the second substrate; and forming the sealant by curing the uncured sealant by irradiating light to the seal barrier and the uncured sealant through at least the first substrate.

In the liquid crystal panel manufacturing method in accordance with the present invention, the liquid crystal panel in accordance with the present invention, in which the sealant is made of a compound containing a photo-curing agent and the first substrate and the seal barrier have light permeation property, can be manufactured efficiently. Further, since the loop-shaped seal barrier having the inclination face is formed and then the sealant is applied onto the inclination face of the seal barrier, bubbles are hardly involved in the sealant in applying the sealant. Particularly, less or no air gap is created between the inclined face of the seal barrier and the sealant. Hence, the liquid crystal panel manufacturing method in accordance with the present invention prevents degradation of the display quality caused due to lowering of the bonding strength.

EFFECTS OF THE INVENTION

The present invention can prevent the liquid crystal layer from being contaminated with the components of the sealant. Further, the bonding strength of the sealant can be maintained. Hence, the excellent display quality is maintained to ensure the reliability of the liquid crystal panel.

EXPLANATION OF REFERENCE NUMERALS

Figure 1:
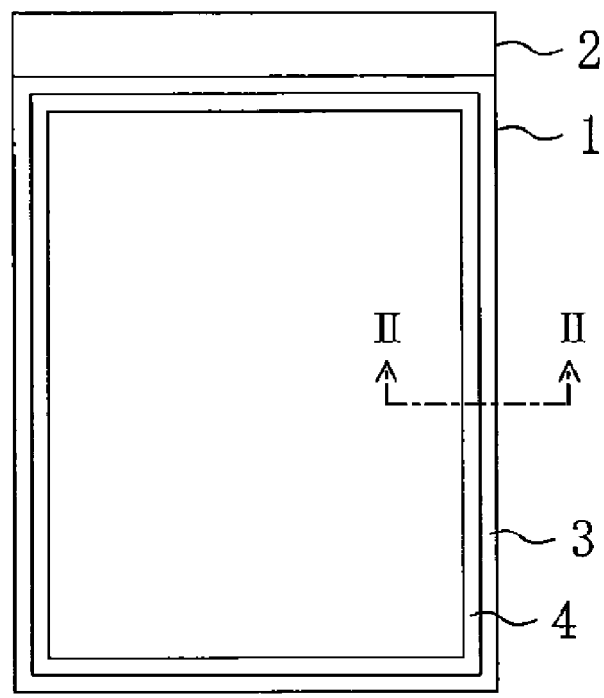
FIG. 1 is a plan view schematically showing a liquid crystal display device in accordance with Embodiment 1.

1 CF substrate
2 TFT substrate
3 sealant
4 seal barrier
5 liquid crystal layer
6 bubbles, glass beads, plastic beads, and others
13 uncured sealant
14 photosensitive resin film
15 liquid crystal material
41 bottom face
42 top face
43 inclined face
45 side face
46 convex curved surface
47 a plurality of convex surface
48 bumpy face

BEST MODE FOR CARRYING OUT THE INVENTION

Embodiments of the present invention will be described below with reference to the accompanying drawings. In the following embodiments, a liquid crystal display device is referred to as an example of liquid crystal panels. The liquid crystal panel of the present invention is, however, applicable to any liquid crystal panels besides the liquid crystal display panel for displaying images. For example, the present invention is applicable to picture shift panels in which pixels are shifted optically and sequentially, parallax barrier panels capable of displaying a three-dimensional image. The picture shift panels include at least one pair of a liquid crystal panel that modulates polarization of light and a birefringence element that shifts a light path according to the polarization of the light emitted from the liquid crystal panel. The parallax barrier panels display stereoscopic images in combination with an image video display element including left eye pixels and right eye pixels.

Embodiment 1

Figure 2:
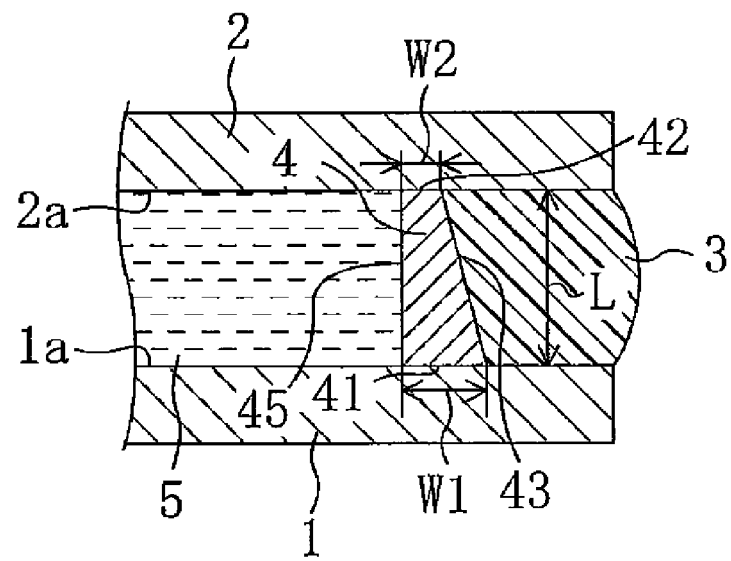
FIG. 2 is a sectional view taken along the line II-II in FIG. 1.

FIG. 1 is a plan view schematically showing a liquid crystal display device in accordance with Embodiment 1, and FIG. 2 is a sectional view taken along the line II-II in FIG. 1. The liquid crystal display device of the present embodiment includes: a color filter (CF) substrate 1 as a first substrate; a TFT (Thin Film Transistor) substrate 2 as a second substrate opposite to the CF substrate 1; a sealant interposed between the CF substrate 1 and the TFT substrate 2 and formed continuously around the peripheries of the substrates 1, 2; a seal barrier 4 continuously formed in the interior of the sealant 3 along the sealant 3; and a liquid crystal layer 5 surrounded by the seal barrier 4.

The CF substrate 1 includes a color filter layer (not shown), a transparent electrode made of ITO (indium thin oxide) and others, and a liquid crystal alignment layer (not shown) made of polyimide, polyamic acid, and so on. The liquid crystal alignment layer is normally used after rubbing treatment, but no rubbing is performed thereon in some cases such as a case using homeotropic (vertical) alignment layer, a case employing PDLC (polymer dispersed liquid crystal) display mode.

The TFT substrate 2 includes: a plurality of gate bus lines (not shown) extending in the row direction; a plurality of source bus lines (not shown) extending across the gate bus lines; a TFT (not shown) provided in the vicinity of each intersection between the gate bus lines and the source bus lines; pixel transparent electrodes (not shown) connected to the source bus lines (not shown) through the TFTs and arranged in matrix; and a liquid crystal alignment layer (not shown) covering the pixel transparent electrodes. Terminals and driving circuits (both not shown) for inputting signals to the gate bus lines or the source bus lines are formed around the sealant 3 on the TFT substrate 2.

The CF substrate 1 and the TFT substrate 2 have light permeation property and are made of glass, such as glass quartz, soda lime glass, borosilicate glass, low alkali glass, no-alkali glass, and so on, or plastic, such as polyester, polyimide, or the like.

The sealant 3 adheres to both the substrates 1, 2 to seal the liquid crystal material, thereby preventing the liquid crystal layer 5 from being contaminated with air and moisture outside the panel. The sealant 3 may be made of a ultraviolet curable compound or a thermosetting compound. For example, a compound may be used which contains acrylic polymer and/or epoxy polymer or acryl-epoxy polymer or the like as a base and a curing agent (initiator) reactive with ultraviolet rays or visible light. The width of the sealant 3 is not determined necessarily and depends on various conditions, such as the material of the sealant 3, but is in the range between 0.3 mm and 3 mm, both inclusive, typically.

The seal barrier 4 includes a bottom face 41 in contact with a face 1a of the CF substrate 1, a top face 42 in contact with a face 2a of the TFT substrate, a side face 43 in the sealant 3 side, and a side face 43 in the liquid crystal layer 5 side. The side face 43 in the sealant 3 side is an inclined face while the side face 45 in the liquid crystal layer 5 side is a perpendicular face so that the contact area of the seal barrier 4 with the CF substrate 1 is larger than the contact area thereof with the TFT substrate 2. Detailed description will be made with reference to FIG. 2. The width W1 of the bottom face 41b of the seal barrier 4 which is in contact with the face 1a of the CF substrate 1 is larger than the width W2 of the top face 42 of the seal barrier 4 which is in contact with the face 2a of the TFT substrate 2. Explaining with the typical size of the seal barrier 4: the width W1 of the bottom face 41 is in the range between 5 μm and 500 μm, both inclusive; the width W2 of the top face 42 is in the range between 3 μm and 400 μM, both inclusive; and the height L of the seal barrier 4 is in the range between 1.5μ and 5 μm, both inclusive. The inclination angle formed between the inclined face 43 of the seal barrier 4 and the face 1a of the CF substrate 1 is in the range between 20° and 80°, both inclusive, and preferably, between 40° and 65°, both inclusive, which are not limited though.

The seal barrier 4 is preferably made of a material having light permeation property. Further, the material of the seal barrier 4 preferably has high adhesiveness to the CF substrate 1 or a film on the CF substrate 1 present in the region where the seal barrier 4 is formed. Concrete examples of the material of the seal barrier 4 include acrylic, polyimide, or epoxy photosensitive organic materials, and inorganic materials, such as silicon dioxide. The seal barrier 4 may be made of a material of the same kind as the sealant 3. This increases the adhesion reliability of the sealant 3 to the seal barrier 4.

The seal barrier 4 may be formed by an ordinary method, such as photolithography. As an example, a method for forming the seal barrier 4 by photolithography will be described. First, a film-like solder resist or a dry film is allowed to adhere onto the CF substrate 1 by a laminator. Alternatively, after a liquid solder resist is applied uniformly onto the entirety of the CF substrate 1 by spin coating, slit coating, slit and spin coating, screen deposition, splaying, curtain coating, or the like, it is pre-baked by a hot plate or an oven. Then, a photomask is laid over the solder resist or the dry film formed on the CF substrate 1, and exposure to a ultraviolet ray, visible light, or the like is performed to obtain a desired pattern. Subsequently, development is performed to remove an unnecessary part, and then, post-baking is performed by a hot plate or an oven to thus form the seal barrier 4.

When a gradation sequence photomask including a (light) shielding portion having a part of which transmittance varies continuously is used for exposure, the inclined face 43 is formed. Specifically, in the case using a solder resist or a dry film of negative type, a photomask is used of which region corresponding to the inclined face 43 lowers in transmittance of the ultraviolet ray outward from the inside continuously. The gradation sequence photomask is disclosed in Japanese Patent Application Laid Open Publication No. 2002-229040.

Alternatively, change in exposure amounts (time period and illuminance) or development conditions (concentration, temperature of developer, developing period) can form the inclined face 43. In the case using an inorganic material for the seal barrier 4, silicon dioxide or the like may be deposited through a deposition mask. Any of various generally-known methods may be employed, such as spattering, EB (Electron Beam) deposition. Change of deposition masks in the process of deposition forms the inclination face 43. Oblique deposition can form the inclination, as well.

Figure 3A:
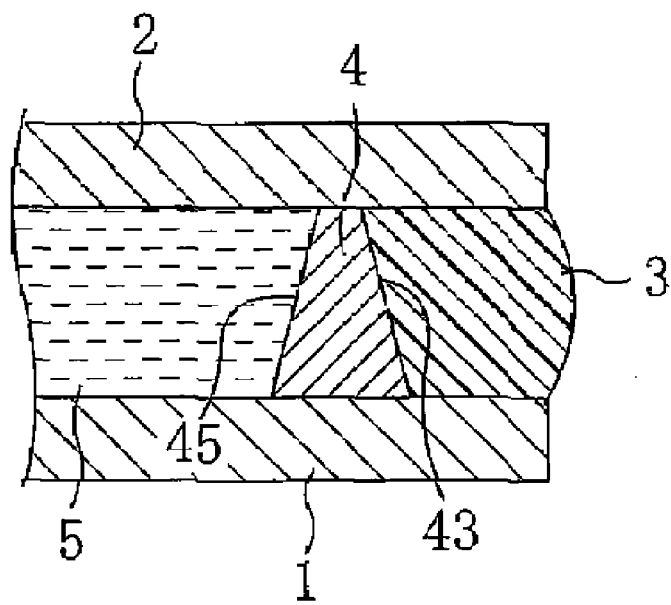
FIG. 3 presents sectional views schematically showing seal barriers in modified examples.
Figure 3B:
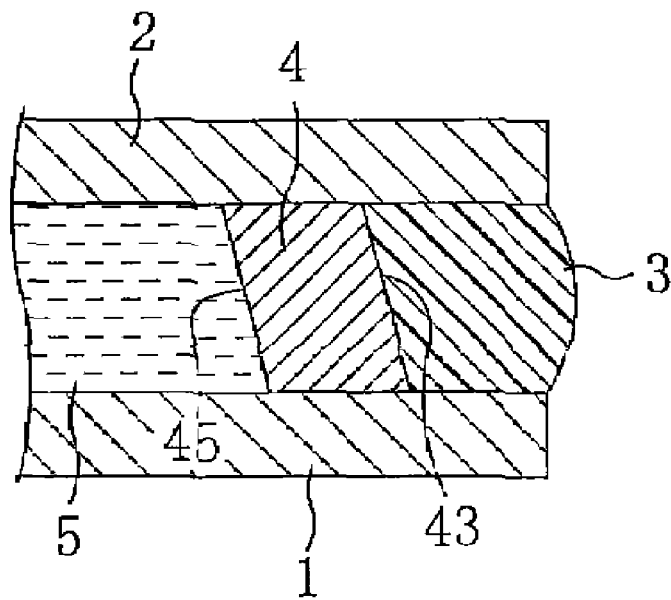

In the present embodiment, the side face 45 in the liquid crystal layer 5 side of the seal barrier 4 is substantially perpendicular to the plane of the CF substrate 1, as shown in FIG. 2, but can be inclined relative to the plane of the CF substrate 1. FIG. 3 presents sectional views schematically showing modified examples of the seal barrier 4. Referring to the side face 45 in the liquid crystal slayer 5 side of the seal barrier 4 shown in FIG. 3(a), the edge on the CF substrate 1 side thereof is located more inside (in the liquid crystal layer 5 side) than the edge on the TFT substrate 2 side thereof. On the other hand, in the side face 45 in the liquid crystal slayer 5 side of the seal barrier 4 shown in FIG. 3(b), the edge on the CF substrate 1 side is located more outside (in the sealant 3 side) than the edge on the TFT substrate 2 side thereof.

In the liquid crystal display device of the present embodiment, the seal barrier 4 intervenes between the sealant 3 and the liquid crystal layer 5, thereby preventing uncured components of the sealant 3 from contaminating the liquid crystal layer 5. Further, the face 43 in the sealant 3 side of the seal barrier 4 is inclined to increase the contact area of the seal barrier 4 with the sealant 3. The seal barrier 4 adhering to the sealant 3 is formed (fixed) on the CF substrate 1 that increases the adhesiveness of the sealant 3 to the CF substrate 1. Hence, relative displacement between the CF substrate 1 and the TFT substrate 2 can be prevented further definitely. This enables reduction in width of the sealant 3 to lead to size reduction of the liquid crystal display device.

Description will be given next to a method for manufacturing the liquid crystal display device in accordance with the present embodiment. FIG. 4 presents sectional views schematically showing steps of manufacturing the liquid crystal display device of the present embodiment. The CF substrate 1 and the TFT substrate 2 can be formed by an ordinary method, such as photolithography, printing, or the like, and therefore, description of the manufacturing steps thereof is omitted.

Figure 4A:
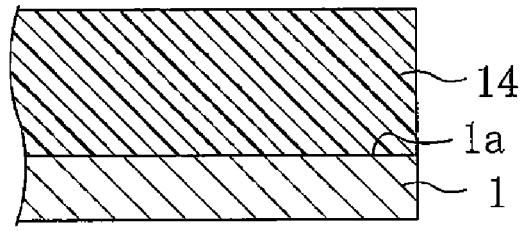
FIG. 4 presents sectional views schematically showing manufacturing steps of the liquid crystal display device in accordance with Embodiment 1.
Figure 4B:
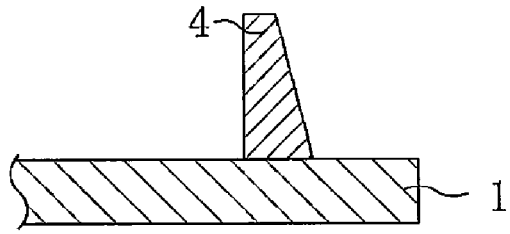

First, as shown in FIG. 4(a), a liquid photosensitive acryl resin is applied onto the face 1a of the CF substrate 1 by screen printing and is dried to form a photosensitive resin film 14. By patterning the photosensitive resin film 14 by photolithography using a gradation sequence photomask, the loop-shaped seal barrier 4 having light permeation property is formed in the vicinity of the periphery of the CF substrate 1 (see FIG. 4(b)).

When the substrates 1, 2 are joined to each other, the seal barrier 4 is slightly compressed. Therefore, it is preferable to set the height of the seal barrier 4 at a value to which an anticipated amount of the compressed height (about 0.2 μm) and a cell gap are added. In the case where the liquid crystal display device includes a column-shaped spacer, the column-shaped spacer is formed simultaneously with formation of the seal barrier 4, thereby simplifying the manufacturing process.

Figure 4C:
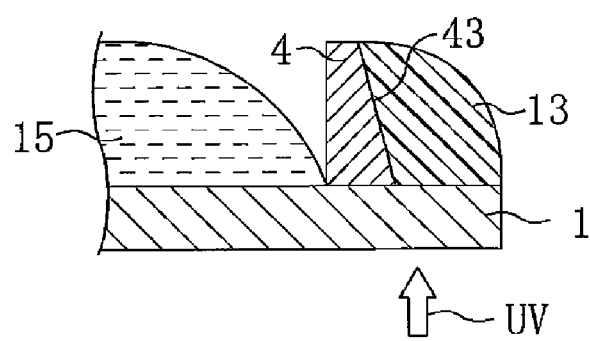
Figure 4D:
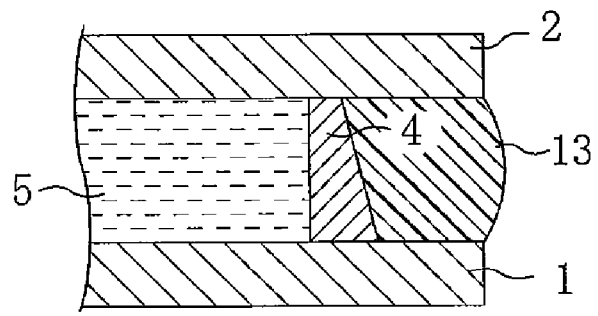

Next, as shown in FIG. 4C, a UV curable uncured sealant 13 containing acryl resin, epoxy resin, or the like is applied to the periphery of the CF substrate 1 on the inclined face 43 side of the seal barrier 4 by screen printing or a dispense method. The pattern of the uncured sealant 13 applied is in a loop shape (a closed frame shape) having no opening through which liquid crystal is to be injected. With the inclined outside face 43 of the seal barrier 4, no or less bubbles are involved into the uncured sealant 13 in applying the uncured sealant 13 to create no or less air gap between the inclined face 43 of the seal barrier 4 and the uncured sealant 13.

After the uncured sealant 13 is applied, for example, a liquid crystal material 15 is dropped into a region on the CF substrate 1 which is surrounded by the seal barrier 4. When the substrates 1, 2 are joined under reduced pressure in a vacuum chamber, the liquid crystal material 15 is sealed in the panel to thus form the liquid crystal layer 5 (see FIG. 4(d)).

Figure 4E:
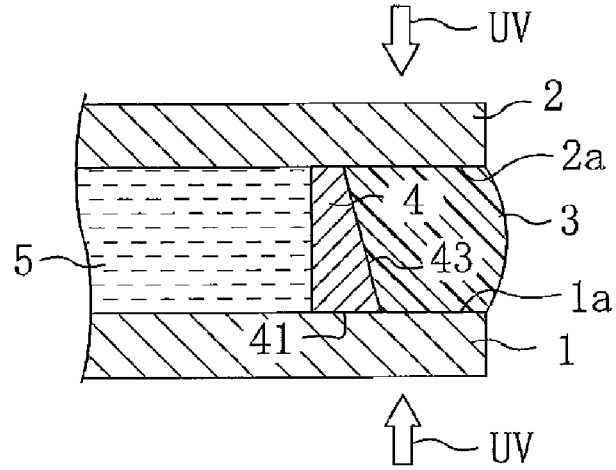

As shown in FIG. 4(e), a ultraviolet ray (UV) is irradiated to the seal barrier 4 and the uncured sealant 13 through both the CF substrate 1 and the TFT substrate 2. This promotes curing of the uncured sealant 13. Since the seal barrier 4 has translucency, part of the ultraviolet ray incident in the bottom face 41 of the seal barrier 4 through the CF substrate 1 outgoes from the inclined face 43 of the seal barrier 4. This also promotes curing of the uncured sealant 13 from a part thereof near the inclined face 43 of the seal barrier 4 to decrease an uncured part of the sealant 13, thereby leading to an increase in bonding reliability of the sealant 3. Through the above steps, the liquid crystal display device of the present embodiment is manufactured.

In the case where the face in the uncured sealant 13 side of the seal barrier 4 is substantially perpendicular to the plane of the CF substrate 1 in contrast, a less amount of the ultraviolet ray is incident to the seal barrier 4 through the CF substrate 1 and the TFT substrate 2 and outgoes from the face on the uncured sealant 13 side. Therefore, an uncured part may remain inside the sealant 3 to lower the bonding reliability of the sealant 3.

The ultraviolet ray is irradiated through both the CF substrate 1 and the TFT substrate 2 in the present embodiment, but may be irradiated through only one of the CF substrate 1 and the TFT substrate 2. The irradiated light has a wavelength capable of curing the uncured sealant 13, for example, may be visible light or an X-ray other than the ultraviolet ray. In a case using a ultraviolet ray, it is preferable to irradiate the ultraviolet ray to the uncured sealant 13 through a photomask shielding the liquid crystal display part so as not to irradiate the ultraviolet ray to the liquid crystal display part.

The seal barrier 4 is formed on the CF substrate 1 in the present embodiment, but may be formed on the TFT substrate 2 rather than on the CF substrate 1. Further, the panel is composed of the CF substrate 1 and the TFT substrate 2 in the present embodiment, but may be composed of a TFT substrate including a color filter and a counter substrate.

Embodiment 2

Figure 5:
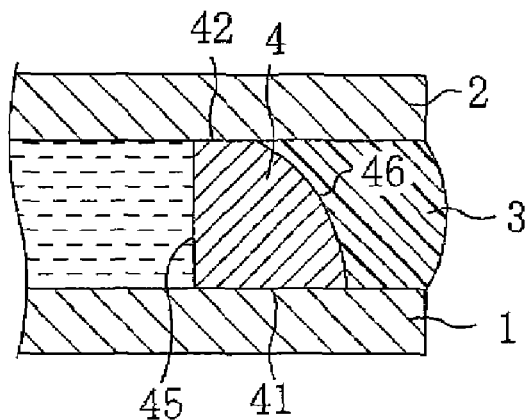
FIG. 5 is a sectional view schematically showing a seal barrier in Embodiment 2.

While the inclined face 43 of seal barrier 4 is flat in Embodiment 1, the inclined face in the present invention is not limited thereto. FIG. 5 is a sectional view schematically showing a seal barrier 4 of Embodiment 2. In the drawings hereafter, the same reference numerals are assigned to elements having substantially the same functions as the elements of the liquid crystal display device in Embodiment 1 for omitting the description thereof.

The inclined face of the seal barrier 4 shown in FIG. 5 is a convex curved surface 46 protruding toward the sealant 3. Curving of the inclined face toward the sealant 3 provides a light scattering characteristic to the inclined face. Specifically, in curing the uncured sealant by irradiating a ultraviolet ray through the CF substrate 1, part of the ultraviolet ray incident from the bottom face 41 of the seal barrier 4 is incident at the interface between the convex curved surface 46 and the uncured sealant. In incidence, the ultraviolet ray, which is scattered at the convex curved surface 46 to have different incident angles, outgoes to the uncured sealant at various angles. In other words, the ultraviolet ray incident through the CF substrate 1 outgoes from the convex curved surface 46 at various angles. Hence, the amount of the ultraviolet ray reaching the inside of the uncured sealant increases to increase the bonding reliability of the sealant 3.

In the case where the inclined face of the seal barrier is curved toward the liquid crystal layer in contrast, an air gap is liable to be created between the inclined face and the sealant. Therefore, some scheme, such as adjustment of viscosity of the sealant to be low should be provided for easily filling the sealant in the curved portion. The contact area increases remarkably when compared with the case with the flat face to increase the bonding strength, thereby increasing the bonding reliability.

Embodiment 3

Figure 6:
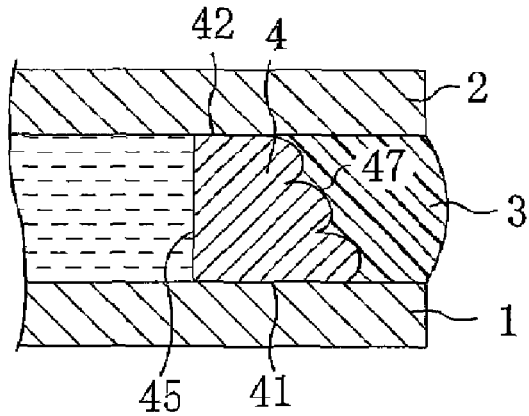
FIG. 6 is a sectional view schematically showing a seal barrier in a first example of Embodiment 3.
Figure 7:
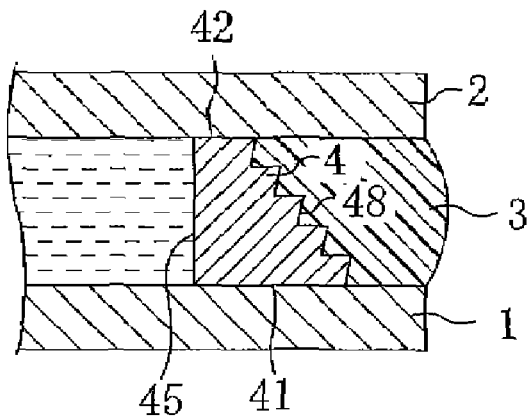
FIG. 7 is a sectional view schematically showing a seal barrier in a second example of Embodiment 3.

The convex curved surface 46 as the inclined face provides the light scattering characteristic to the inclined face in Embodiment 2, but the scheme for providing the light scattering characteristic to the inclined face is not limited thereto. In the present embodiment, the inclined face is in a bumpy shape for providing the light scattering characteristic to the inclined face. FIG. 6 is a sectional view schematically showing a seal barrier 4 in a first example of the present embodiment, and FIG. 7 is a sectional view schematically showing a seal barrier 4 in a second example of the present embodiment. The seal barrier 4 shown in FIG. 6 includes a plurality of convex surface 47 protruding toward the sealant 3, and the inclination face of seal barrier 4 shown in FIG. 7 includes a bumpy face 48 in a saw-tooth shape when viewed in section.

In the present embodiment, similarly to Embodiment 2, the bumpy shape provides the light scattering characteristic to the inclined face, thereby increasing the bonding reliability of the sealant 3. Further, the inclined face is roughened to increase the contact area of the inclined face with the sealant 3 when compared with a case with the flat inclined face, thereby increasing adhesiveness of the inclined face to the sealant.

Embodiment 4

Figure 8:
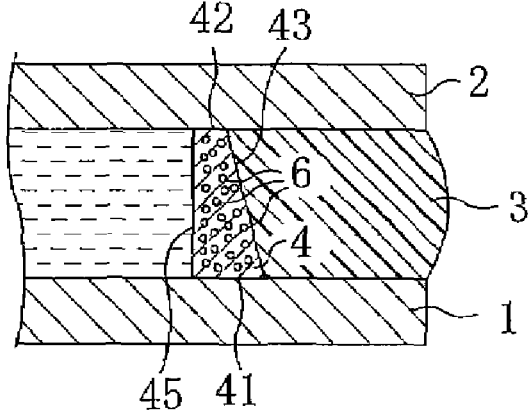
FIG. 8 is a sectional view schematically showing a seal barrier in Embodiment 3.

While the light scattering characteristic is provided to the inclined face in Embodiments 2 and 3, the light scattering characteristic is provided to the seal barrier 4 itself in the present embodiment. FIG. 8 is a sectional view schematically showing a seal barrier 4 in the present embodiment. The seal barrier 4 in the present embodiment is formed of two or more kinds of phases different from each other in refractive index. Specifically, substances 6 having a refractive index different from the seal barrier 4, such as bubbles, glass beads, plastic beads, or the like are distributed in the seal barrier 4. It is preferable that the difference in refractive index from the seal barrier 4 is large, and more preferably, is approximately 0.1. Referring to a method for forming the seal barrier 4 in which bubbles are distributed, resin in which small bubbles are inserted and kept by blowing a gas may be used as the material of the seal barrier 4.

The seal barrier 4 in the present embodiment includes a phase formed of a material having a refractive index different from the material forming the seal barrier 4 to form a plurality of interfaces inside the seal barrier 4. Accordingly, the ultraviolet ray that is incident from the top face 42 and the bottom face 41 of the seal barrier 4 and is introduced inside the seal barrier 4 is refracted when transmitting through or being reflected by the plurality of interfaces in the seal barrier 4 to be scattered in various directions. This leads to an increase in bonding reliability of the sealant 3, similarly to Embodiments 2 and 3.

Only the preferred embodiments of the present invention have been described heretofore, and the technical scope of the present invention is not limited to the above embodiments. It is understood by a person having ordinary skill in the art that the above embodiments are mere examples, that the elements and the processes therein can be combined and modified variously, and that such modified examples fall within the scope of the present invention.

For example, TFTs are employed as liquid crystal driving elements in Embodiments 1 to 4, but the liquid crystal driving elements may be other active driving elements, such as MIMs (Metal Insulator Metals) or the like. Alternatively, passive driving (multiplex) using no driving elements may be employed. The liquid crystal display device may be any of transmissive type, reflective type, and transflective/semi-transmissive type.

INDUSTRIAL APPLICABILITY

The liquid crystal panel in accordance with the present invention can be utilized as any general panel including a liquid crystal layer as an element. For example, it can be utilized as a liquid crystal display panel, a picture shift panel, a parallax barrier panel, and the like. More specifically, it can be utilized in mobile phones, PDAs (Personal Digital Assistances), personal computers, thin television sets, medical displays, car navigation systems, amusement machineries, and the like.

The invention claimed is:

1. A liquid crystal panel, comprising a first substrate, a second substrate opposed to the first substrate, a loop-shaped sealant formed around peripheries of the first substrate and the second substrate between the first substrate and the second substrate, a loop-shaped seal barrier formed along the sealant in interior of the sealant, and a liquid crystal layer surrounded by the seal barrier,
   wherein the sealant is made of a compound containing a photo-curing agent, and the first substrate and the seal barrier have light permeation property,
   the seal barrier includes an inclined face in a sealant side, and
   the inclined face has a light scattering characteristic and is bumpy.

2. A liquid crystal panel, comprising a first substrate, a second substrate opposed to the first substrate, a loop-shaped sealant formed around peripheries of the first substrate and the second substrate between the first substrate and the second substrate, a loop-shaped seal barrier formed along the sealant in interior of the sealant, and a liquid crystal layer surrounded by the seal barrier,
   wherein the sealant is made of a compound containing a photo-curing agent, and the first substrate and the seal barrier have light permeation property,
   the seal barrier includes an inclined face in a sealant side, and
   the seal barrier is formed of two or more kinds of phases different from each other in refractive index.

3. A method for manufacturing a liquid crystal panel according to claim 1 or 2, comprising the steps of:
   forming the seal barrier in a loop shape on the first substrate;
   applying an uncured sealant in the inclined face side of the seal barrier;
   dropping a liquid crystal material within a region surrounded by the seal barrier;
   joining the first substrate and the second substrate; and
   forming the sealant by curing the uncured sealant by irradiating light to the seal barrier and the uncured sealant through at least the first substrate.

4. The method for manufacturing a liquid crystal panel according to claim 3, wherein in the step of forming the sealant by curing the uncured sealant by irradiating light to the seal barrier and the uncured sealant through at least the first substrate, the light is ultraviolet light, and the liquid crystal layer is shielded from the light using a photo mask.

5. The liquid crystal panel of claim 1 or 2, wherein the inclined face is roughened.

6. The liquid crystal panel of claim 1 or 2, wherein the seal barrier contacts both of the sealant and the liquid crystal layer.

7. The liquid crystal panel of claim 1 or 2, wherein the seal barrier has a shape of a parallelogram in cross section.

8. The liquid crystal panel of claim 1 or 2, wherein the seal barrier has a saw tooth shape in cross section.

9. The liquid crystal panel of claim 1 or 2, wherein the seal barrier is made of a same material as the sealant.

\* \* \* \* \*